United States Patent Office.

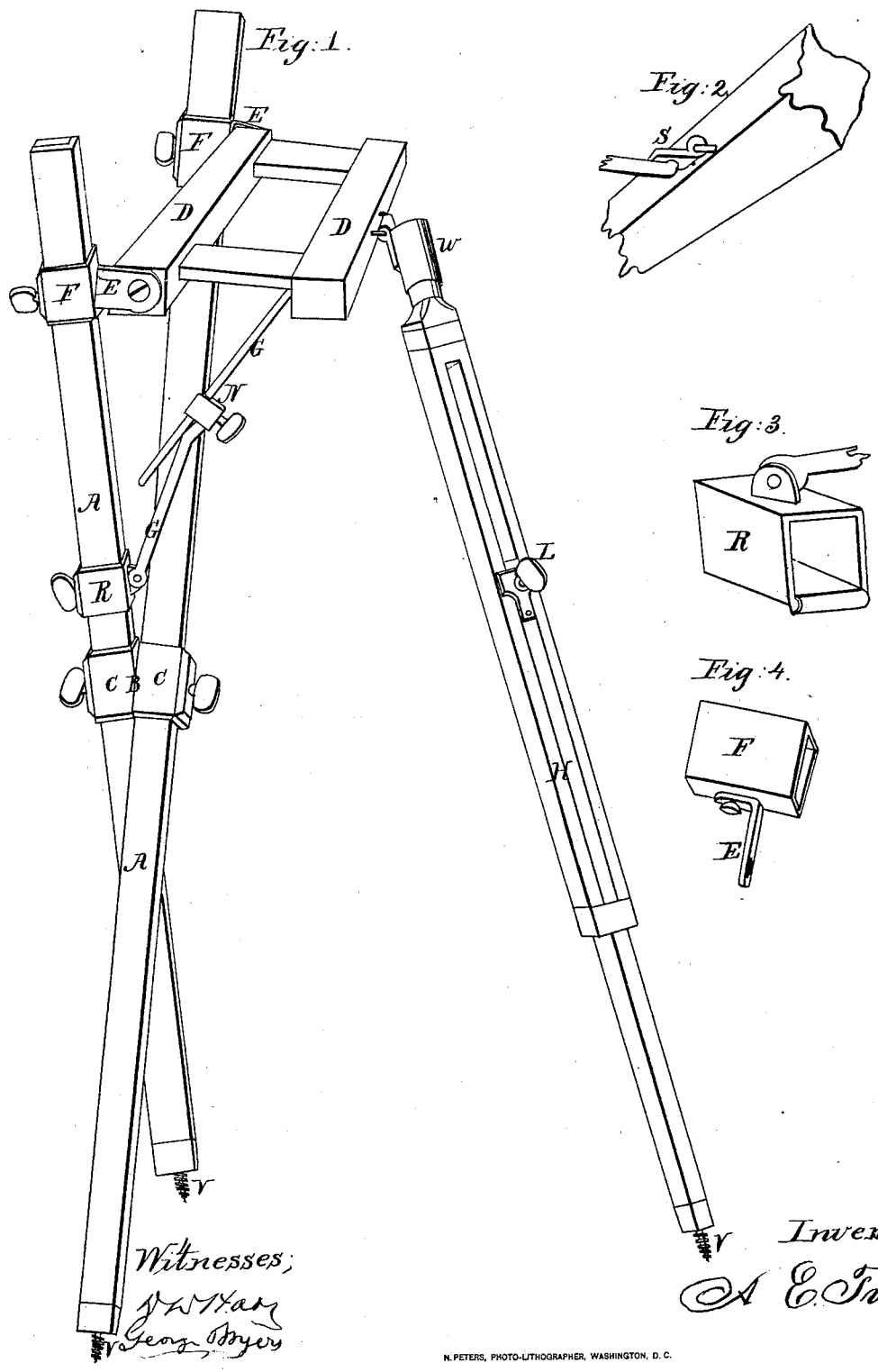

A. E. TURNBULL, OF UPPER SANDUSKY, OHIO.

Letters Patent No. 94,672, dated September 7, 1869.

CAMERA-STAND.

The Schedule referred to in these Letters Patent and making part of the same.

*To all whom it may concern:*

Be it known that I, A. E. TURNBULL, of Upper Sandusky, in the county of Wyandot, in the State of Ohio, have invented a new and useful Improvement in Camera-Stands for Out-Door Photographing; and I do hereby declare that the following is a full, clear, and exact description of the construction and operation of the same, reference being had to the annexed drawings, making a part of this specification, in which—

Figure 1 is a perspective view.

Figures 2, 3, and 4 are enlarged sections of the most indistinct and important parts of fig. 1.

This invention consists in forming, by the arrangement, a very light, strong, and convenient support for cameras when required to be placed on uneven ground, or most any place that the artist wishes to obtain a view from, and is constructed as follows:

A A are two rods of wood, connected at B, by being slid through the two slides C C, which, secured together by a rivet, make a pivot on which they may be turned.

The D frame, on which the camera rests is provided with two slides similar to the slides C C, and having pieces E E pivoted to them, and which are screwed to the frame D, making a universal joint. The upper ends of the rods A A slide through the slides F F, thus supporting the front of the frame D.

The said frame is also braced by the brace G G, which is secured at its upper end to the frame D by the universal joint S, fig. 2, and is fastened by a universal joint to the slide R, at its lower end, figs. 1 and 3.

This slide has a thumb-screw in it at N, by which it can be lengthened or shortened.

The back of the frame D is supported by the extension-leg H, which is constructed of three strips of wood, the two upper of which are fastened together, and the third slides between them, and is kept in place by the screw and clamp L.

The top of this leg H fits into the socket W, which is attached by a universal joint to the frame D.

The rods A A, and leg H, have, at their lower ends, screws inserted, which answer the purpose of spikes, to prevent the legs slipping, and can also be screwed into any soft substance, which will secure greater steadiness and prevent its being upset.

The operation is as follows:

By loosening the screws in the slides F$_F$ C$_c$, the rod A$_A$ can be slid, in case of the ground being too low or high, or the other rod A in a like manner.

The stand is placed at any angle by the screws L and N.

A further description is hardly necessary, as it will readily be seen, that by properly adjusting the different parts, the stand can be placed in almost any place desired.

What I claim as my invention, and desire to secure by Letters Patent, is—

The slides C C, F F, and R, the sliding brace G G and its connections, the screws V V V, and extension-leg H, connected as described, or the whole of the devices explained, to operate separately or in connection with each other, for producing the results in the manner and for the purpose herein described, the whole to operate substantially in the manner and for the purpose set forth.

A. E. TURNBULL.

Witnesses:
D. D. HADY,
GEORGE MYERS.